(12) United States Patent
Chau et al.

(45) Date of Patent: Aug. 6, 2013

(10) Patent No.: US 8,502,104 B2

(54) METHOD OF BUILDING UP AN ALUMINUM ALLOY PART

(75) Inventors: Cathy Chau, Plaisir (FR); Katia Duverneuil, Laval en Brie (FR)

(73) Assignee: SNECMA Services, Paris (FR)

( * ) Notice: Subject to any disclaimer, the term of this patent is extended or adjusted under 35 U.S.C. 154(b) by 293 days.

(21) Appl. No.: 12/033,559

(22) Filed: Feb. 19, 2008

(65) Prior Publication Data

US 2008/0199344 A1    Aug. 21, 2008

(30) Foreign Application Priority Data

Feb. 20, 2007   (FR) ..................................... 07 53366

(51) Int. Cl.
*B23K 9/04*        (2006.01)
(52) U.S. Cl.
USPC ................... 219/76.1; 219/121.6; 219/121.84
(58) Field of Classification Search
USPC .............. 219/121.6, 149, 121.84, 148; 419/8
See application file for complete search history.

(56) References Cited

U.S. PATENT DOCUMENTS

| | | | |
|---|---|---|---|
| 3,465,426 A | | 9/1969 | Baier et al. |
| 4,464,646 A | * | 8/1984 | Burger et al. ................... 338/25 |
| 4,605,599 A | * | 8/1986 | Penrice et al. ................ 428/665 |
| 4,665,294 A | * | 5/1987 | Hira et al. ................ 219/121.64 |
| 5,074,109 A | * | 12/1991 | Mandet et al. ................... 60/792 |
| 5,375,759 A | * | 12/1994 | Hiraishi et al. ................ 228/175 |
| 5,919,853 A | * | 7/1999 | Condit et al. ................... 524/413 |
| 5,961,862 A | * | 10/1999 | Lewis et al. ............. 219/121.84 |
| 6,376,800 B1 | * | 4/2002 | Updegrove et al. ...... 219/121.85 |
| 6,467,124 B1 | * | 10/2002 | Small ............................... 15/401 |
| 2001/0006722 A1 | | 7/2001 | Sakai et al. |
| 2006/0134320 A1 | * | 6/2006 | DeBiccari et al. ............ 427/140 |

FOREIGN PATENT DOCUMENTS

| | | |
|---|---|---|
| DE | 100 32 975 A1 | 1/2002 |
| EP | 1 674 595 A2 | 6/2006 |
| JP | 10-80827 | 3/1998 |

\* cited by examiner

*Primary Examiner* — Henry Yuen
*Assistant Examiner* — Ayub Maye
(74) *Attorney, Agent, or Firm* — Oblon, Spivak, McClelland, Maier & Neustadt, L.L.P.

(57) ABSTRACT

A method of building up an aluminum alloy part by welding is disclosed. The method includes the steps of manually depositing a layer of aluminum alloy powder on the part in a build-up zone and welding the powder layer onto the part by laser welding. A mask having an opening of dimensions corresponding to the dimensions of the build-up zone is positioned on the part and the layer of powder is deposited on the part both in the build-up zone and overlaps onto the mask around the build-up zone. The height of the powder layer relative to the surface of the part is calibrated prior to the welding step.

14 Claims, 4 Drawing Sheets

FIG.3

METHOD OF BUILDING UP AN ALUMINUM ALLOY PART

The invention relates to a method of building up (i.e. repairing) an aluminum alloy part.

BACKGROUND OF THE INVENTION

In general, a part is built up by providing material (in the form of powder, frit, ...) at locations where the part presents cracks (or fissures) and/or depressions. To do this, it is common practice to use welding or brazing techniques.

The method of the invention can be used in particular for building up a part of a turbomachine (e.g. a turbojet, a turboprop, a terrestrial gas turbine, ...) and, more particularly, a turbojet fan casing.

Turbojet fan casings are usually made of aluminum alloy and suffer damage during fabrication (blows from tools) or while the turbojet is in operation (ingesting pebbles or other projectiles that strike the casing). In general, it is difficult to build up such casings by welding since the weldability of the aluminum alloys used is rather limited, such alloys having very high thermal conductivity and great reflectivity.

Amongst known methods, it is known to build up a part by using tungsten inert gas (TIG) welding. Nevertheless, that method presents drawbacks: the zone of the part that is thermally affected by the welding is too great and it presents significant amounts of deformation. Furthermore, before being able to proceed with building up, it is necessary to remove the fan casing so as to separate it from the remainder of the turbojet low-pressure compressor module (also known as the fan and booster module), since the electric arc generated during TIG welding would damage ball bearings forming part of the assembly.

OBJECTS AND SUMMARY OF THE INVENTION

An object of the invention is to provide a method of building up a part by welding, which method gives rise to a thermally affected zone that is limited and to deformations that are small in the build-up zone, and furthermore is capable of being used for building up a turbojet fan casing without it being necessary to remove the casing.

To achieve this object, the invention provides a method of building up an aluminum alloy part by welding, the method comprising the steps of:
  manually depositing a layer of aluminum alloy powder on the part in a build-up zone; and
  welding said powder layer onto said part by laser welding.

It has been found that the laser welding performed gives rise to a thermally affected zone and to deformations that are smaller than those that occur when performing TIG welding.

Furthermore, because the powder is deposited manually, the equipment needed for implementing such a method is compact. This makes it easy to access the part that needs to be built up, even when it is still assembled with other parts. More particularly, this makes it possible to access a turbojet fan casing while it is still integrated in the compressor module. Advantageously, the fan casing is thus built up without removing the casing from the remainder of the turbojet compressor module, thereby saving precious time. In addition, since no electric arc is generated by laser welding, there is no risk of damaging ball bearings.

BRIEF DESCRIPTION OF THE DRAWINGS

The invention and its advantages can be better understood on reading the following detailed description of implementations of the method of the invention. The description refers to the accompanying drawings, in which.

MORE DETAILED DESCRIPTION

Figure 1:
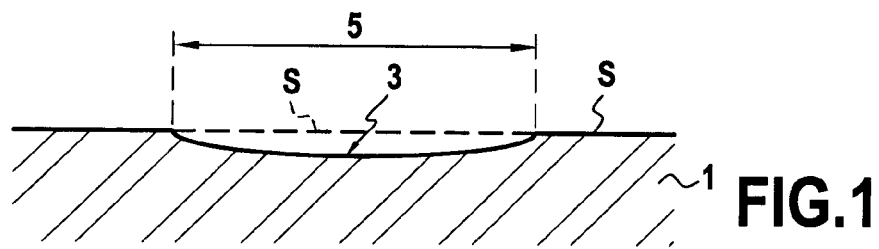
FIG. 1 is a diagrammatic section view of an example of a part for building up.
Figure 2:
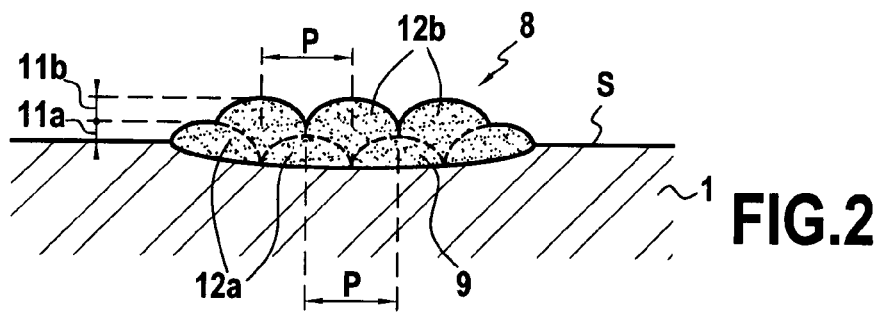
FIGS. 2 to 5 are diagrams showing various steps in an implementation of the method of the invention as, applied to the part of FIG. 1.

With reference to FIGS. 1 to 5, there follows a description of a first implementation of the method of the invention, used for filling in a cup-shaped depression 3 in a part 1, shown in section in FIG. 1. The part 1 is a fan casing for a two-spool bypass turbojet, and it belongs to the low-pressure compressor module of the turbojet, which also comprises the fan and the low-pressure compressor (or booster).

The build-up zone 5 of the part 1 corresponds to the extent of the depression 3. Furthermore, when reference is made to the "surface" of the part, that term covers the general surface S of the part. In the build-up zone 5, the surface S therefore does not correspond to the bottom of the depression 3, but, as shown in dashed lines in FIG. 1, to the surface S that the part would have if there were no depression 3.

In the method of the invention, a layer 8 of aluminum alloy powder 9 is deposited manually on the part 1, in the build-up zone 5.

In practice, to obtain the layer 8, it is possible to deposit at least two sublayers 11$a$, 11$b$ in succession, each formed by a plurality of beads of powder 9, which beads are parallel and spaced apart at a pitch P.

In the example described, in order to build up (i.e. to repair) the part 1, the first sublayer 11$a$ is deposited in the form of beads 12$a$ that are spaced apart by a pitch P, and thereafter the second sublayer 11$b$ is deposited that is made up of beads 12$b$ spaced apart at the same pitch P, but offset through a distance P/2 relative to the beads 12$a$.

Juxtaposing sublayers of beads of powder 9 makes it possible to obtain a layer 8 that is well densified, and of thickness that is relatively stable.

In an implementation of the invention, the height H of the layer 8 of powder is calibrated relative to the surface S of the part 1. In this manner, the thickness E of the layer 8 for depositing is controlled, where the thickness E has an influence on the quality of the laser welding that is performed. If the thickness were to be too small, then a lack of surface material would appear.

For a given depth D of depression (or crack) relative to the surface S of the part 1, the thickness E of the layer 8 is equal to D+H, where H is the height of the layer 8 relative to the surface S of the part 1. By calibrating the height H, the thickness E is also controlled.

This calibration step naturally takes place after a step of depositing the layer of powder, and before the step of laser welding.

To perform this calibration step, it is advantageous to make use of a scraper comprising at least one support foot that is caused to stand on the surface S of said part, with a scraper blade set back relative to the stand so that the distance d between the scraper blade and the surface of said part corresponds to the height H that is desired for the layer 8 of powder.

Figure 3:
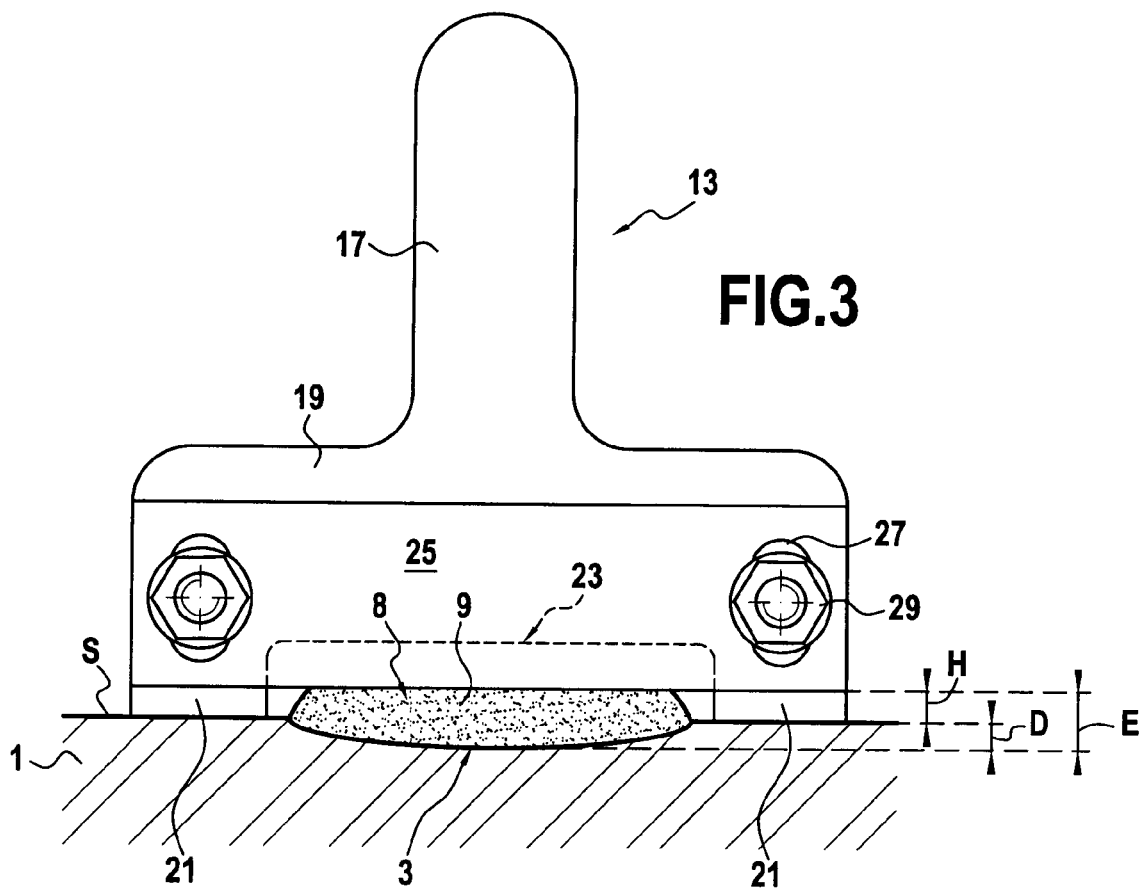
Figure 6:
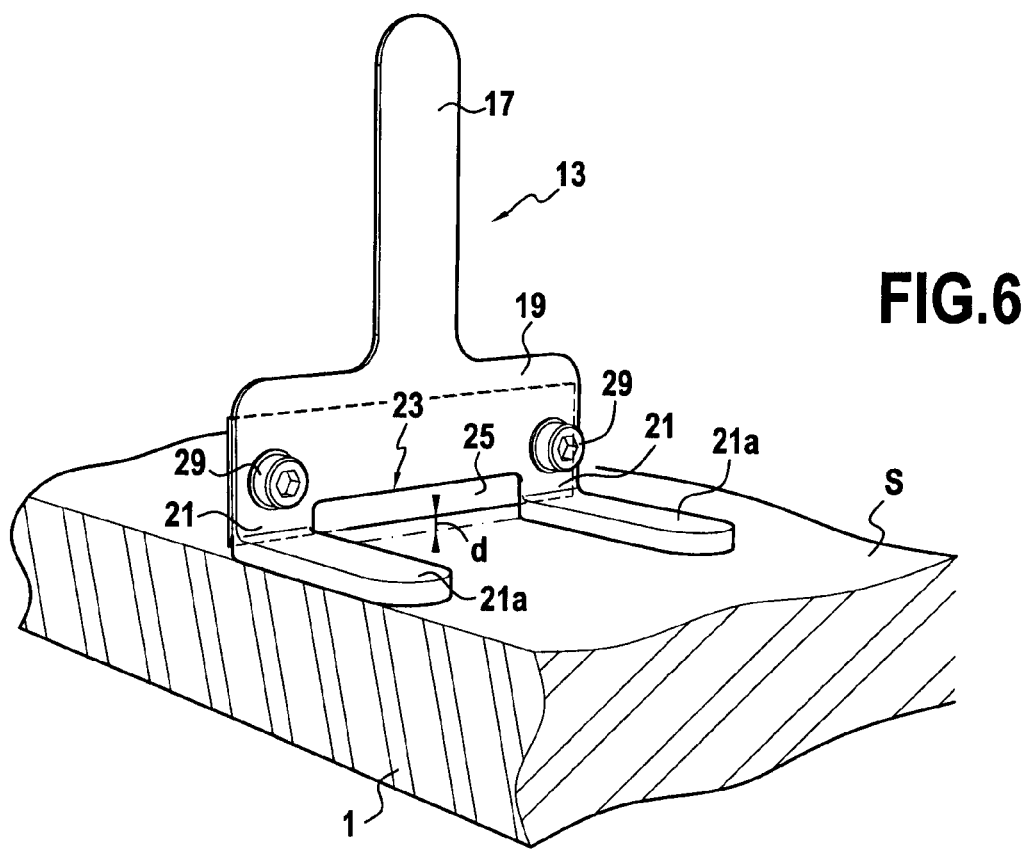
FIG. 6 is a perspective view showing an example of a scraper used while implementing the method of the invention.
Figure 7:
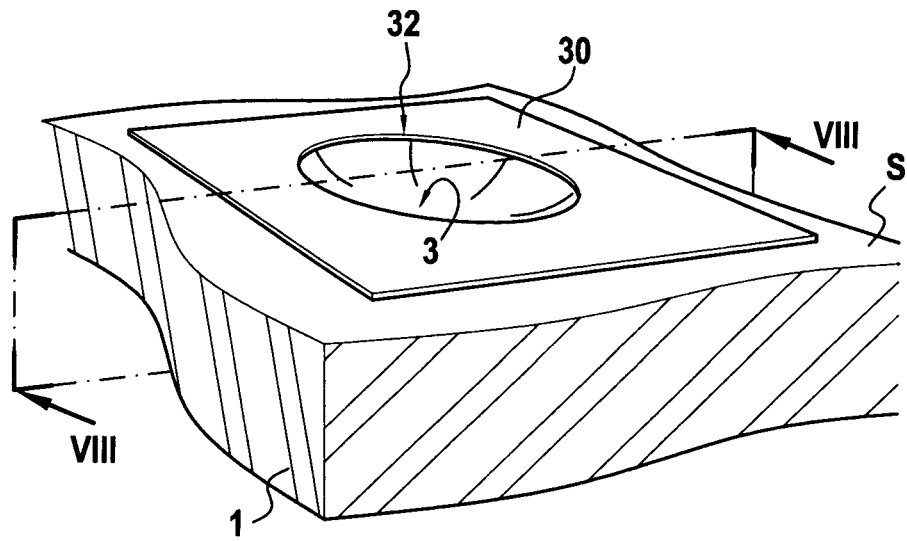
FIG. 7 is a diagrammatic perspective view showing an example of a part for building up, covered by a mask.
Figure 8:
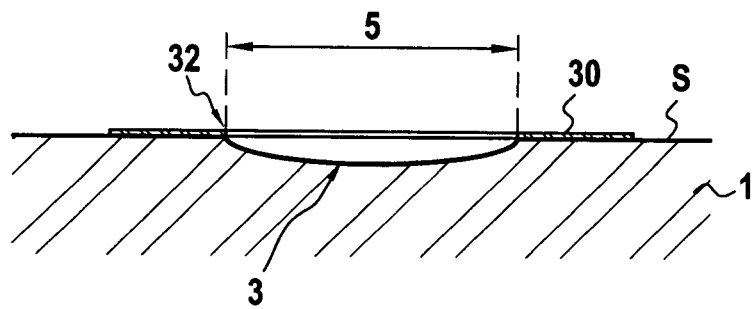
FIGS. 8 to 11 are diagrams showing the various steps in an implementation of the invention as applied to the FIG. 7 part.
Figure 9:
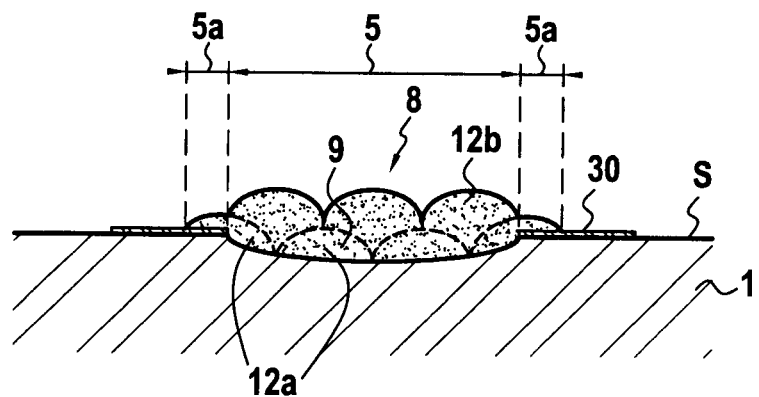

An example scraper 13 is shown in FIGS. 3 and 6. The scraper 13 stands on the horizontal surface S of the part 1 and includes a handle 17 that is connected to the scraper body 19. The body 19 has two support feet 21, one on either side (symmetrically about a vertical midplane of the scraper), and extending firstly vertically downwards and then through a 90° bend so as to form two horizontal support strips 21a. When the scraper 19 is in use, it is these support strips 21a that are caused to slide over the surface S. These support feet 21 define between them a broad notch 23 in a vertical plane. The scraper blade 25 is mounted on the body 19 and covers the notch 23 in part. This blade 25 is suitable for sliding vertically relative to the body 19 so that it is possible to adjust the vertical position of the blade 25, and thus adjust the distance d between the scraper blade 25 and the surface S of the part 1, so that it corresponds to a determined value for the height H of the layer of powder.

In the example, the blade 25 presents two oblong openings 27 that are vertically oriented, and the scraper has two screw-and-nut assemblies 29 that are fastened in the body 19 and through the openings 27.

In order to adjust the distance d and cause it to correspond with the height H, the screw-and-nut assemblies 29 are loosened, and the blade 25 is moved into the desired position, whereupon the assemblies 29 are re-tightened.

When the scraper 13 is in use, the support feet 21 are placed on either side of the layer 8 of powder (see FIG. 3), the support strips 21a are pressed against the surface S, and the scraper is moved manually, causing its support strips to slide on the surface S. Because of the support strips 21a, the orientation (here vertical orientation) of the blade 25 remains the same while the scraper 13 is being moved so that the distance d between the blade 25 and the surface S of the part 1 remains constant.

By passing the scraper 13 over the layer 8 of powder, as shown in FIG. 3, the top portion of the layer 8 of powder is smoothed to a calibrated height H: the grains of powder 9 situated at a height greater than the height H are moved by the blade 25 towards the zones of the layer 8 that are of a height that is less than the height H, or to the periphery of said layer 8.

After the layer 8 has been deposited, and advantageously calibrated in height, the laser welding step is performed.

For this step, use is made for example of a diode layer 40 that provides beam/material interaction that is more regular than that provided by a laser of the yttrium aluminum garnet (YAG) type.

Figure 4:
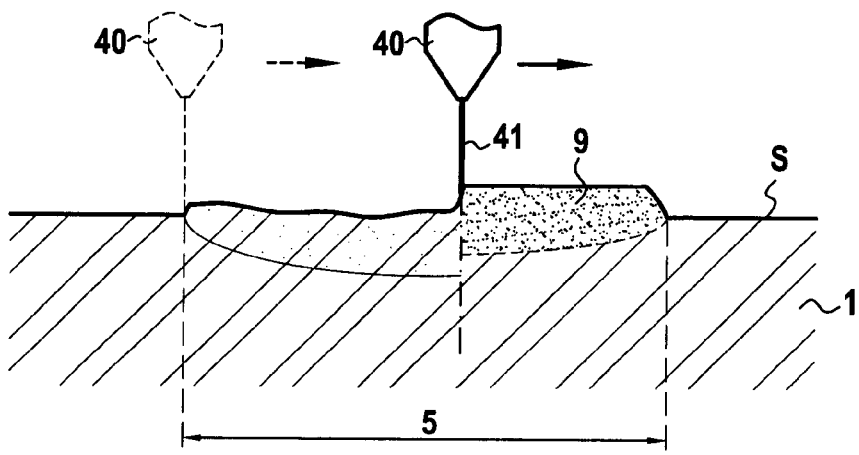

The laser beam 41 that is emitted then travels over the build-up zone 5, as shown in FIG. 4. The energy delivered by the beam 41 causes the powder 9 to melt and mix together with adjacent portions of the part 1. On cooling, the desired build up is obtained.

Figure 5:
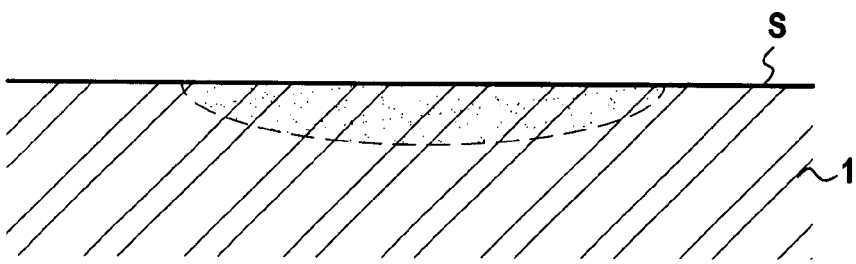

In one implementation, after the welding step, in order to restore aerodynamic properties to the part 1, the part is leveled by machining in the build-up zone 5, since the surface of the part 1 in this zone is generally not perfectly plane after welding. FIG. 5 shows the final part as obtained after the machining step.

With reference to FIGS. 7 to 12, there follows a description of a second implementation of the build-up method of the invention. It differs from that of FIGS. 2 to 5 in that it makes use of a mask 30. The mask 30 is shown in perspective in FIG. 7 and in section in FIG. 8. By way of example, it is constituted by a sheet of aluminum alloy.

The mask 30 is provided with an opening 32 of the same size as the build-up zone 5. The mask 30 is positioned on said part by making said opening 32 coincide with the build-up zone 5, and said layer 8 of aluminum alloy powder is deposited in the build-up zone 5, overflowing onto the mask 30 (see FIG. 9). The overlap zone is referenced 5a in FIGS. 9 and 11.

Figure 10:
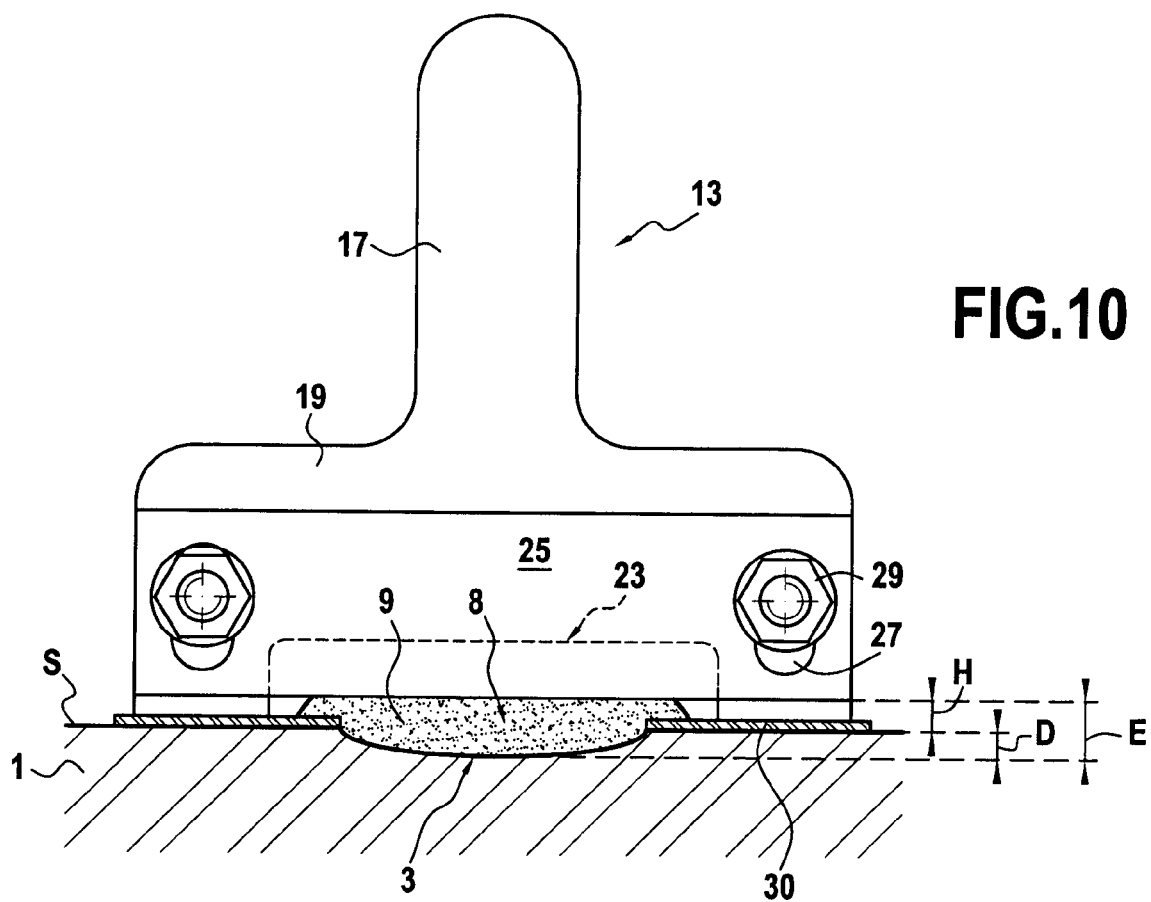
Figure 11:
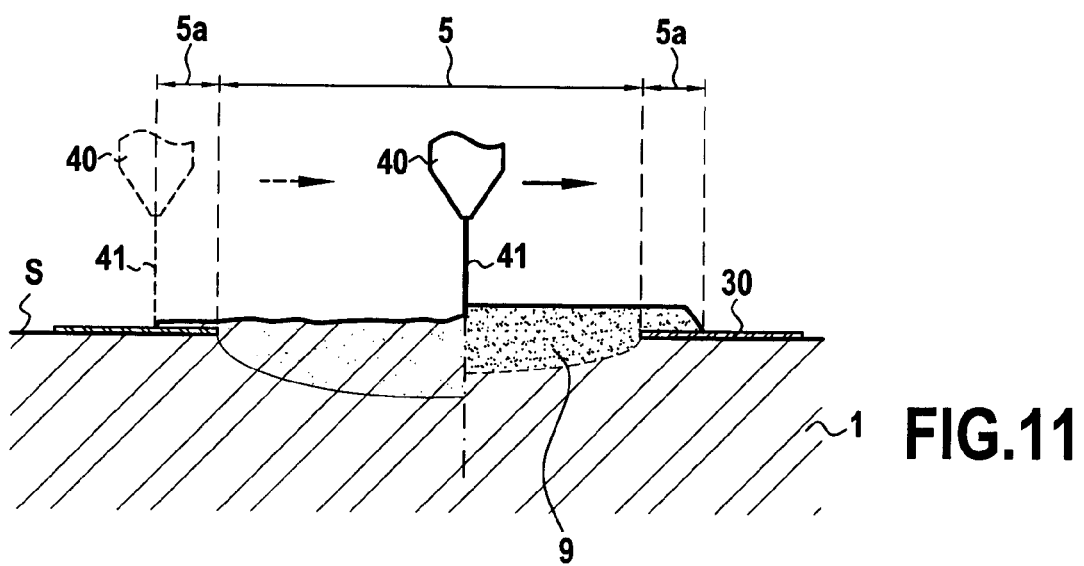

Theater, the layer 8 is scraped and subjected to laser welding, as shown in FIGS. 10 and 11. These steps are analogous to those described above and shown in FIGS. 3 and 4.

In the method of FIGS. 2 to 5, the periphery of the powder layer 8 corresponds substantially to that of the build-up zone 5, and the interaction between the laser beam 4 and the part 1 in the transition zone between the build-up zone 5 and the remainder of the part 1 can lead to microcracks being formed. Such microcracks are harmful insofar as they are situated in the (near) periphery of the build-up zone 5, or even in the build-up zone 5, and they run the risk of weakening it.

By causing the layer 8 of powder to overlap onto the mask 30, the periphery of the layer 8 is offset to outside the periphery of the build-up zone 5. Should such microcracks be created during welding, then they are located at the periphery of the overlap zone 5a and are therefore far enough away from the build-up zone 5 to avoid weakening it.

After the welding step, the mask 30 is removed together with the powder 9 of the overlap zone 5a that is welded onto the mask 30. Welded powder remains on the part 1 only in the build-up zone 5. If necessary, the part can be leveled by machining in the build-up zone 5.

In the examples above, the part 1 may be made of aluminum alloy of type 6061, while the aluminum alloy powder 9 may be of type 5356 with grain size lying in the range 63 micrometers (μm) to 125 μm, centered around 70 μm. In order to build up such a part 1 when it presents a depression having a maximum depth D equal to 0.75 millimeters (mm), the height H for the powder relative to the surface S is selected to be equal to 1.4 mm. The power of the laser diode 40 used is 2750 watts (W) so as to obtain good surface regularity in the build-up zone and so as to obtain a dilution zone of satisfactory depth. The dilution zone is the zone where mixing occurs between the filler material (i.e. the powder 9) and the substrate (i.e. the part 1). It is desirable for the depth of the dilution zone not to be too great, and preferably it remains less than 0.05 mm. The travel speed of the laser is 1 meter per minute (m/min). The mask 30 that is optionally used is made of a sheet of aluminum alloy of type 5182, having a thickness of 1.5 mm.

What is claimed is:

1. A method of building up an aluminum alloy part by welding and using a scraper that includes at least one support foot that rests an outer surface of said aluminum alloy part, and a scraper blade that is set back relative to the at least one support foot, the aluminum alloy part having a build-up zone to be built-up, the method comprising:

using a mask with an opening having substantially a same dimension as a peripheral section of the build-up zone, said mask having a predetermined thickness;

positioning the mask on said part by causing said opening to correspond with the build-up zone;

manually depositing a powder layer of aluminum alloy powder on the build-up zone, said powder layer overlapping onto said mask around said build-up zone;

placing the support foot of the scraper on the outer surface of said aluminum alloy part and smoothing the powder layer with the scraper to a calibrated height relative to the outer surface of said part, the calibrated height being larger than the thickness of the mask and the calibrated height corresponding to a distance between the scraper blade and the outer surface of said part; and welding said powder layer onto said part by laser welding so as to build-up the build-up zone.

2. The method according to claim 1, wherein the distance between the scraper blade and the outer surface of said part is adjustable, and said distance is adjusted to correspond to the calibrated height of the powder layer.

3. The method according to claim 1, wherein, after the welding step, the part is leveled by machining in the build-up zone.

4. The method according to claim 1, wherein said mask is made of aluminum alloy sheet.

5. The method according to claim 1, wherein said part is a turbomachine part.

6. The method according to claim 1, further comprising removing said mask after welding said powder layer onto said part by laser welding.

7. The method according to claim 1, wherein the powder layer is welded onto said part and said mask by laser welding, the method further comprising removing the mask with the powder being welded thereon.

8. The method according to claim 1, wherein the calibrated height of powder layer relative to the outer surface of said part is at least equal to a maximum depth of a depression in the build-up zone.

9. The method according to claim 1, wherein the layer of aluminum alloy powder manually deposited on the build-up zone includes a first sublayer formed by a first plurality of beads of powder which are parallel and spaced apart at a pitch P, and a second sublayer formed by as second plurality of beads of powder which are spaced apart at the pitch P and offset by a distance P/2 relative to the first plurality of beads of powder.

10. The method according to claim 1, wherein the support foot of the scraper includes a first vertical portion that extends vertically downwards and a second horizontal portion that forms a horizontal support strip which rests on the outer surface of said part.

11. The method according to claim 2, wherein the scraper blade includes two oblong openings which are vertically oriented, and the scraper includes two screw-and-nut assemblies which are fastened in the scraper through the oblong openings.

12. The method according to claim 5, wherein said part is a turbojet fan casing of a low pressure compressor module of a turbojet.

13. The method according to claim 12, wherein said turbojet fan casing is built-up without removing said casing from the low pressure compressor module of the turbojet.

14. A method of building up an aluminum alloy turbojet fan casing of a low pressure compressor module of a turbojet by welding, said turbojet fan casing having a build-up zone to be built-up, the method comprising:

identifying the build-up zone to be built-up on said turbojet fan casing;

keeping said turbojet fan casing on the low pressure compressor module of the turbojet;

using a mask with an opening having substantially a same dimension as a peripheral section of the build-up zone, said mask having a predetermined thickness;

positioning the mask on said turbojet fan casing by causing said opening to correspond with the build-up zone;

manually depositing a powder layer of aluminum alloy powder on the build-up zone, said powder layer overlapping onto said mask around said build-up zone;

smoothing the powder layer to a calibrated height relative to an outer surface of said turbojet fan casing, the calibrated height being larger than the thickness of the mask; and welding said powder layer onto said turbojet fan casing by laser welding without removing said turbojet fan casing from the low pressure compressor module of the turbojet.

* * * * *